United States Patent Office 3,414,402
Patented Dec. 3, 1968

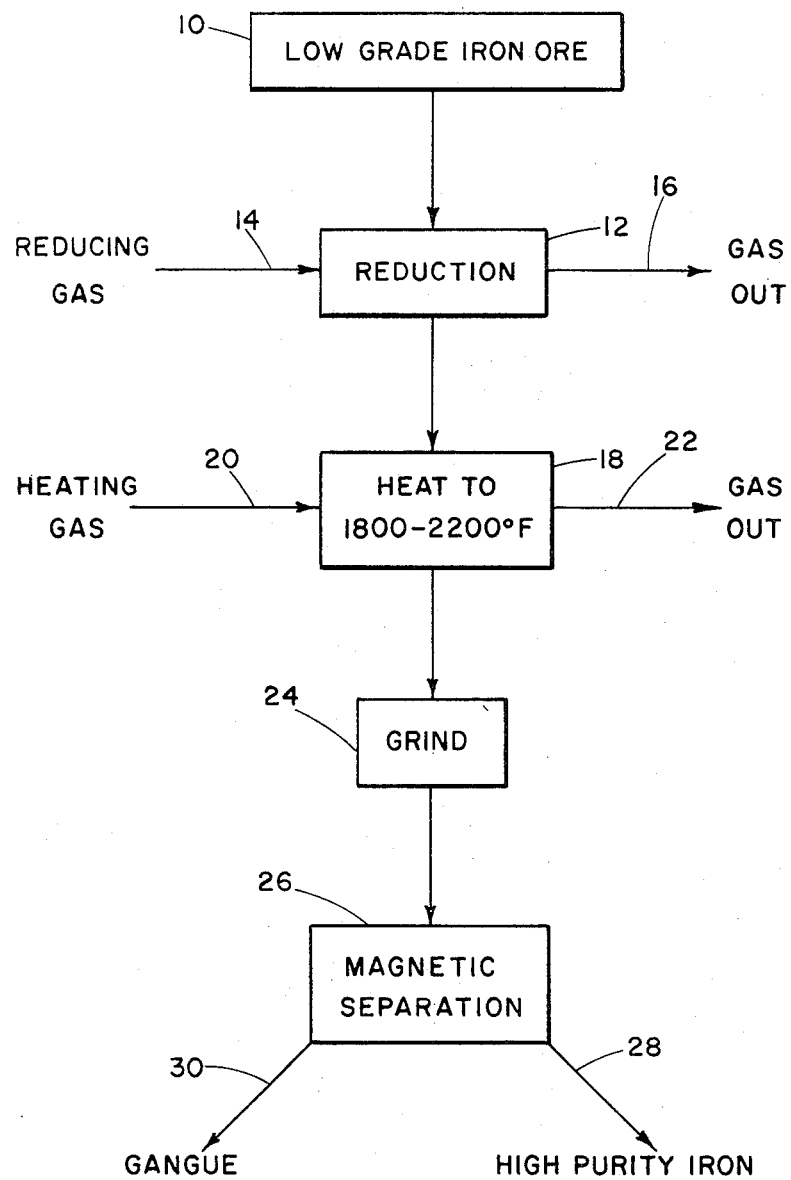

3,414,402
BENEFICIATION OF LOW GRADE IRON ORES
William Volk and Clarence A. Johnson, Princeton, N.J., assignors to Hydrocarbon Research, Inc., New York, N.Y., a corporation of New Jersey
Continuation-in-part of application Ser. No. 411,988, Nov. 18, 1964. This application June 16, 1967, Ser. No. 646,568
7 Claims. (Cl. 75—26)

ABSTRACT OF THE DISCLOSURE

A process for beneficiation of low grade, normally non-magnetic, iron ores utilizing either a fluidized bed or dilute phase reduction technique to produce a mixture of reduced metallic iron and gangue, followed by a controlled heat treatment step of the mixture after which a relatively simple grinding permits facile and high yield magnetic separation of the iron from the gangue.

Cross references to other applications

This application is a continuation-in-part of our application "Beneficiation of Low Grade Iron Ores," Ser. No. 411,988, filed Nov. 18, 1964.

Background of the invention

This invention is related to the field of reduction and beneficiation of low grade normally non-magnetic iron ores.

The beneficiation of low grade iron ores such as limonite and siderite has been extremely difficult due to their inherent, non-magnetic quality and the fineness of the iron particles as well as the large proportion of gangue. The iron particles are distributed throughout the gangue and each particle is essentially encompassed by its own gangue shell. The reduction treatment is, of course, available to the iron ore in the gangue but this only results in converting the iron from a non-magnetic to a magnetic metallic iron. The problem is separating this reduced iron from the gangue and heretofore a satisfactory separation and recovery has been obtained only by a very fine and costly grinding of the reduced mixture to about 500 mesh. Normally, a grinding to this fineness is required to make available a sufficient amount of the iron to the magnetic separation means so as to make the process worth while. It has been found, for instance, that if the grind is to only 200 mesh practically no separation can be effected. Other ores, for example, those containing iron silicates, are equally difficult to beneficiate as the iron cannot be separated from the gangue after a simple grinding. (Mesh sizes are given according to U.S. Standards.)

Summary of the invention

Our invention consists of an improved process for reduction and beneficiation of low grade iron ores so that a high yield of reduced metallic iron may be obtained more economically then heretofore has been possible.

The ore under consideration is a low grade ore normally having less than 50% iron, such as limonite or siderite, which usually contain only in the order of 30% to 40% iron. It is contacted in several stages with hydrogen or other suitable reducing gas at a given temperature and pressure in either a fluidized dense phase bed or dilute phase type reactor so that the iron oxide component of the ore is reduced to a magnetic form, usually metallic iron. The reduced ore is then subjected to a particular heat treatment after which it has been unexpectedly found, a satisfactory magnetic separation of the reduced iron in high yield can be obtained with only a 200 mesh grinding. It is also possible to utilize our invention with a fixed bed type of reduction process. Apparently, the heat treatment causes a crystal growth in the iron component of the ore, or other disruption of the structure which results in a significant economical advantage of recovery of iron with our invention and a 200 mesh grind which is essentially the same as the usual recovery with a 500 mesh grind. The avoidance of very fine grinds is of course of great financial benefit.

It is understood, of course, that our invention will work equally as well with a low grade magnetic iron ore.

Our invention further consists in providing an integrated system of preheating, reducing, heat modifying and magnetically separating iron from gangue in low grade ores whereby beneficiation is rendered economical.

Description of the drawing

The drawing is a flow diagram of the major operating steps for treating a low grade ore by our beneficiation process.

Preferred embodiment of the invention

As shown in the drawing, ore from an ore supply at 10 is fed to reduction step 12. The ore may be ground prior to the reduction.

The ore is reduced substantially to metallic iron by contacting it with a reducing gas 14 such as hydrogen, carbon monoxide or combinations thereof in the temperature range from about 850° F. to 1700° F. Normally, a reducing gas containing at least 50% hydrogen is preferred.

The contacting process may be of the fixed bed type or the fluidized type, either dilute or dense phase. For fluidized operation, the reducing gas is passed upwardly through the ore. Normal conditions for the process would be a contacting temperature in the range from about 850° F. to 1700° F. The gas rate would vary depending on whether the process was dense or dilute phase. Typical process conditions for a fluidized process of the dense phase type would be a reducing gas pressure in the range of 200 to 400 p.s.i.g., a gas flow rate in the range of 0.5 to 1.0 ft./sec. and a reduction temperature of less than 1200° F. For this type operation, the ore would normally be ground to about 20 mesh prior to pretreatment.

If a dilute phase operation were desired, the ore would normally be ground to pass at least 100 mesh and the gas flow rate would be in the range of 5 to 15 ft./sec. It is also possible to reduce in the dilute phase at temperatures up to 1700° F. with reducing gas pressures in the range of 50 to 100 p.s.i.g. Gas is purged at 16 and may be recovered in part and returned to the system.

This reduction step 12 may be either a single or multiple stage operation.

After reduction, the reduced ore is passed to heating step 18. The reduced ore may be maintained in either the dense or dilute fluidized phase during the heating step as was done in the reduction step by passing a heating gas upwardly through the ore to maintain fluidization. The heating gas 20 may be the same gas used in the reduction step or another inert gas. The important characteristic of the heating gas is that it be non-oxidizing. The gas out is shown at 22.

The temperature of the heating step is preferably in the range of 1800° F. to 2200° F. The heating time is solely dependent on the type of ore being processed and of course the extent of the conversion to metallic iron in the reduction step. However, it would normally be in the range from 10 minutes to 4 hours.

If the heating step is a dilute phase operation, the metallic iron may become sintered, however, it is a relatively simple operation to grind the sintered iron and gangue mixture to 200 mesh and then magnetically separate the iron. It has generally been found that the heating step can be effectively accomplished with avoidance of sintering at temperatures in the order of 2000–2200° F. in a fluidized process if up to 1 percent by weight of carbon is added.

After the heating step 18, the reduced ore-gangue mixture is subjected to a mild grinding operation 24 in the order of at least passing 200 mesh and this step is then followed by magnetic separation 26 with the iron at 28 separated from the gangue at 30.

The full explanation of the metallurgy of the heating step 18 in the order of 1800–2200° F. is not fully known, but it is quite evident in practice that this heating, after (or with) reduction, accomplishes a highly desirable condition of the material. It is believed that the crystals of iron tend to grow in size and it is apparent that the amount of iron recovered by magnetic effect materially improves.

As an example of temperature effect, the following results were determined on a particular ore:

ANALYSIS 100% REDUCED BASIS

| Temperature, °F. | Percent Fe | Percent gangue | Percent Fe recovery | Percent gangue removal |
|---|---|---|---|---|
| Ore | 56.8 | 43.2 | | |
| 900 | 70.8 | 29.2 | 89.1 | 45.8 |
| 1,400 | 71.2 | 28.8 | 91.3 | 46.8 |
| 2,000 | 76.9 | 23.1 | 96.1 | 60.5 |

The best results, for this ore, were at a heating temperature of 2000° F. under which conditions 60% of the gangue could be removed by magnetic beneficiation with 96% iron recovery.

Additional illustrations of iron recoveries with various ores are shown in the following examples. In each case, the reduced ore after the heat treatment was ground to pass 200 mesh and magnetically separated from the gangue:

EXAMPLE I

| | | Percent |
|---|---|---|
| Peace River ore: | | |
| Initial | Iron | [1] 40.2 |
| | Gangue | 30.6 |
| Sinter | Iron | 98 |
| | Gangue | 2 |
| | Iron recovery | 98 |

[1] All percentages are by weight.

EXAMPLE II

| | | Percent |
|---|---|---|
| Peace River ore, second sample: | | |
| Initial | Iron | 40.7 |
| | Ignition loss | 11.0 |
| | Reducible O₂ | 17.3 |
| | Total Gangue | [1] 31.0 |
| Sinter | Iron | 76.9 |
| | Gangue | 23.1 |
| | Iron Recovery | 96.1 |

[1] About 75% silica.

EXAMPLE III

| | | Limonite (percent) | Siderite (percent) |
|---|---|---|---|
| Initial | Iron | 43.0 | 43.3 |
| | Gangue | 26.4 | 15.6 |
| Sinter | Iron | 83.5 | 89.6 |
| | Gangue | 14.5 | 10.4 |
| | Iron recovery | 86.4 | 97.5 |

While we have shown and described preferred forms of embodiment of our invention, we are aware that modifications may be made thereto and we thus desire to broadly interpret our invention within the scope and spirit of the disclosure herein and of the claims appended hereinafter.

We claim:

1. In combination with an iron ore reduction process of the type wherein the ore is a low grade, normally non-magnetic ore having an iron concentration of less than 50% and the ore is reduced by contacting it at a temperature in the range from about 850° to 1700° F. with a reducing gas containing at least 50% hydrogen and the ore is then ground and magnetically separated from the gangue; the improvement which comprises:
   (a) heating the reduced ore prior to grinding to a temperature in the range from about 1800° F. to 2200° F. in the presence of a non-oxidizing gas for a time between 10 minutes to 4 hours.

2. The process as claimed in claim 1 wherein the non-oxidizing heating gas used in the heating step is the same as the reducing gas.

3. The process as claimed in claim 1 wherein the ore is from the class consisting of limonite and siderite.

4. The process as claimed in claim 1 wherein the reduced ore is ground to pass at least 200 mesh, after the heating step, but prior to magnetic separation.

5. The process as claimed in claim 1 wherein the ore is initially ground to pass 20 mesh, the reducing gas pressure is in the range of 200 to 400 p.s.i.g., the gas rate is within the range of 0.5 to 1.0 ft./sec. and upflow through a bed of ore and the reduction temperature does not exceed 1200° F.

6. The process as claimed in claim 1 wherein the ore is initially ground to pass 100 mesh, the reducing gas pressure is in the range of 200 to 400 p.s.i.g.; the gas rate is within the range of 5 to 15 ft./sec., and the reduction temperature does not exceed 1200° F.

7. The process as claimed in claim 1 wherein the reducing gas pressure is in the range of 50–100 p.s.i.g., the gas rate is within the range of 5.0 to 15 ft./sec., the reduction temperature does not exceed 1700° F.

No references cited.

HYLAND BIZOT, *Primary Examiner.*

BENJAMIN HENKIN, *Assistant Examiner.*